(12) United States Patent
Hotton

(10) Patent No.: US 11,223,264 B2
(45) Date of Patent: Jan. 11, 2022

(54) ELECTRO-MAGNETIC MOTOR

(71) Applicant: Tom Hotton, Indio, CA (US)

(72) Inventor: Tom Hotton, Indio, CA (US)

(*) Notice: Subject to any disclaimer, the term of this patent is extended or adjusted under 35 U.S.C. 154(b) by 211 days.

(21) Appl. No.: 16/733,540

(22) Filed: Jan. 3, 2020

(65) Prior Publication Data

US 2020/0227990 A1 Jul. 16, 2020

Related U.S. Application Data

(60) Provisional application No. 62/792,183, filed on Jan. 14, 2019.

(51) Int. Cl.
*H02K 21/24* (2006.01)
*H02K 21/22* (2006.01)
*H02K 21/02* (2006.01)

(52) U.S. Cl.
CPC ......... *H02K 21/222* (2013.01); *H02K 21/026* (2013.01); *H02K 21/028* (2013.01); *H02K 21/24* (2013.01)

(58) Field of Classification Search
CPC ............... H02K 21/022; H02K 21/023; H02K 21/025–21/028; H02K 21/12; H02K 21/24
See application file for complete search history.

(56) References Cited

U.S. PATENT DOCUMENTS

| | | | |
|---|---|---|---|
| 3,686,521 A | 8/1972 | Henry-Baudot | |
| 3,935,487 A | 1/1976 | Czerniak | |
| 4,196,365 A | 4/1980 | Presley | |
| 7,466,044 B2 | 12/2008 | Elmaleh | |
| 9,190,949 B1 * | 11/2015 | Vanderelli | H02K 21/24 |
| 9,997,979 B1 | 6/2018 | Garrison et al. | |
| 2011/0109185 A1 * | 5/2011 | Sullivan | H02K 21/24 |
| | | | 310/156.35 |
| 2013/0093295 A1 * | 4/2013 | Rabal | H02K 47/14 |
| | | | 310/68 B |
| 2017/0133897 A1 * | 5/2017 | Ritchie | H02K 21/24 |
| 2019/0260246 A1 * | 8/2019 | Igwemezie | H02K 11/0094 |

* cited by examiner

*Primary Examiner* — Ramon M Barrera

(74) *Attorney, Agent, or Firm* — Harpman & Harpman

(57) ABSTRACT

A magnetic motor comprising a rotating flywheel coupled to rotate a drive output shaft within a support cage. Multiple permanent magnets extend directionally from the flywheel. Pairs of positionally fixed electro-magnets extend from the cage effacing platforms for sequential selective magnetic interaction with permanent magnets rotatable driving the flywheel and the drive output shaft.

9 Claims, 4 Drawing Sheets

ELECTRO-MAGNETIC MOTOR

This application claims the benefit of U.S. Provisional Application No. 62/792,183, filed Jan. 14, 2019.

BACKGROUND OF THE INVENTION

1. Technical Field

This invention relates to magnetic motors that utilize magnetic forces to effect rotation of an armature having magnetics positioned thereabout.

2. Description of Prior Art

Prior art has disclosed a number of magnetic motor devices that use a number of different compliant commanding control elements, along with combinations of permanent and electro-magnet elements; see for example U.S. Pat. Nos. 3,686,521, 3,935,487, 4,196,365, 7,466,044 and 9,997,979.

In U.S. Pat. No. 3,686,521, a magnetic motor is disclosed having indirect poles and winding coils.

U.S. Pat. No. 3,935,487 discloses a permanent magnetic motor, having a movable magnet shield inter-disposed between multiple effacing magnets. The shield is moved as they pass one another imparting magnetic forces thereto selectively.

U.S. Pat. No. 7,466,044 claims an electro-magnetic circular engine with a hub assembly and at least three alternators.

Finally, in U.S. Pat. No. 9,997,979 a magnetic kinetic propulsion motor is illustrated with self-aligning repositioning magnets on a stationary housing and 2 ended rotating blades within the housing.

SUMMARY OF THE INVENTION

A magnetic motor using position and shape of permanent and electro-magnets to induce a rotational field. The motor has a primary flywheel, support sets of armature space permanent magnets extending oppositely therefrom. Multiple electro-magnets on fixed opposing support surfaces are oriented for magnetic pole field overlap when energized selectively and sequentially by proximity switches, thereby rotating the flywheel with the attached permanent magnets and the centrally positioned output drive shaft by magnetic force.

DETAILED DESCRIPTION OF THE INVENTION

Figure 1:
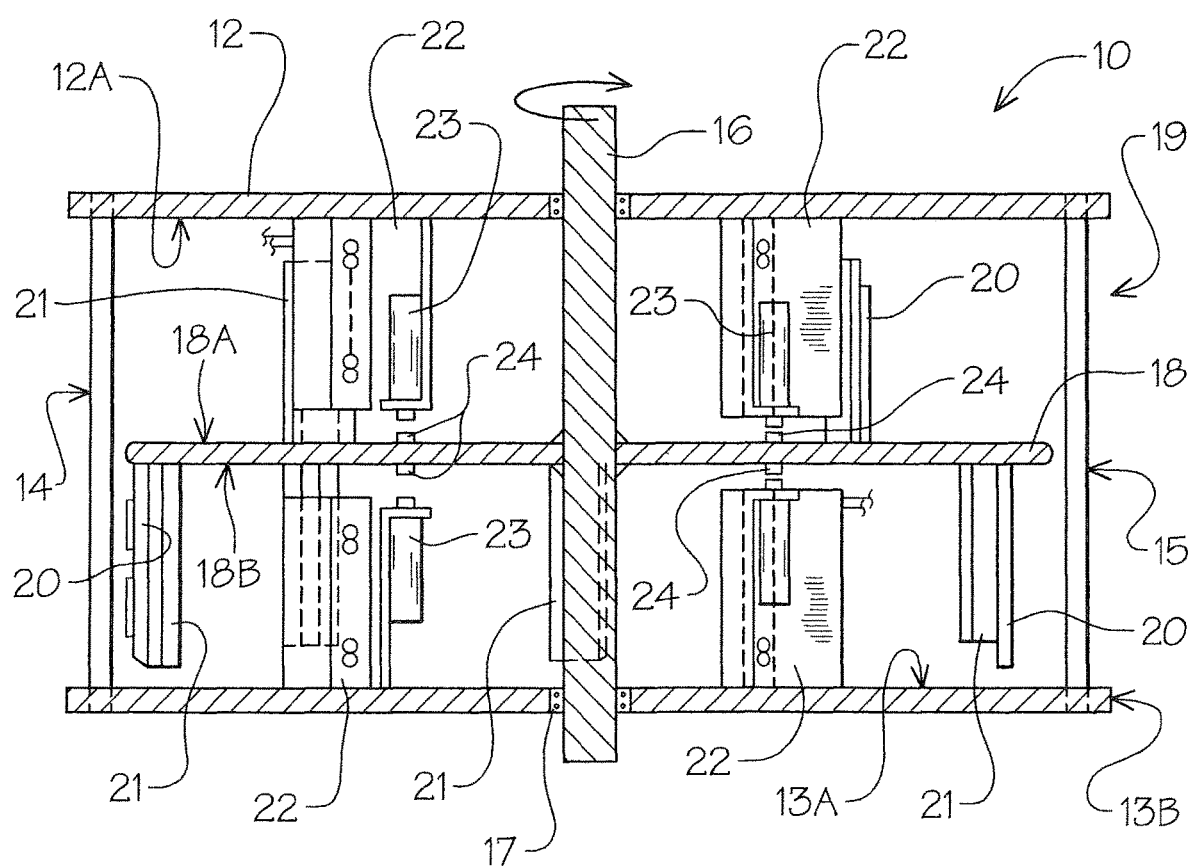
FIG. 1 is a sectional view on lines 1-1 of FIG. 2.
Figure 2:
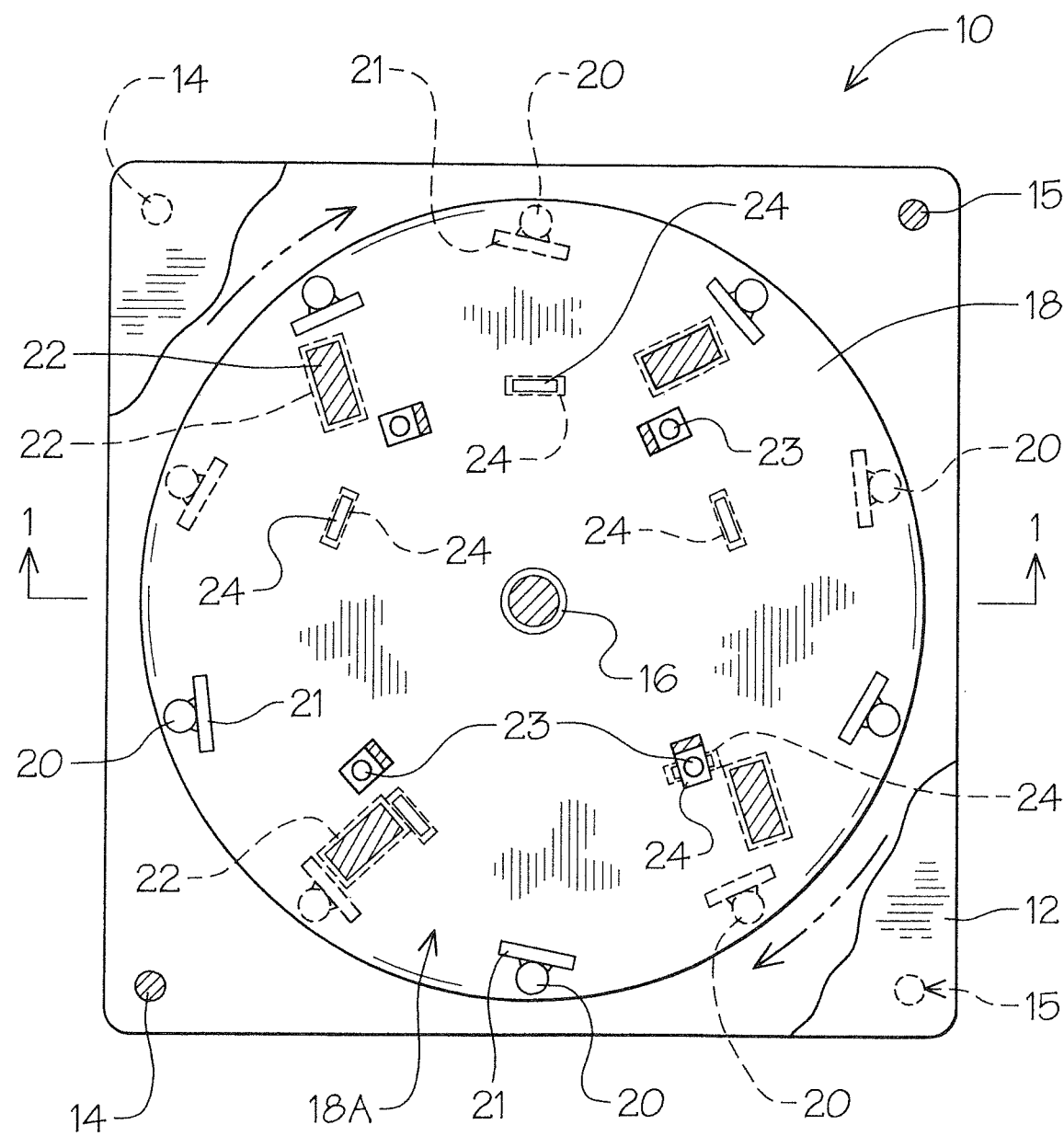
FIG. 2 is a top plan composite view with portions broken away and in dotted lines of the magnetic motor of the invention.
Figure 3:
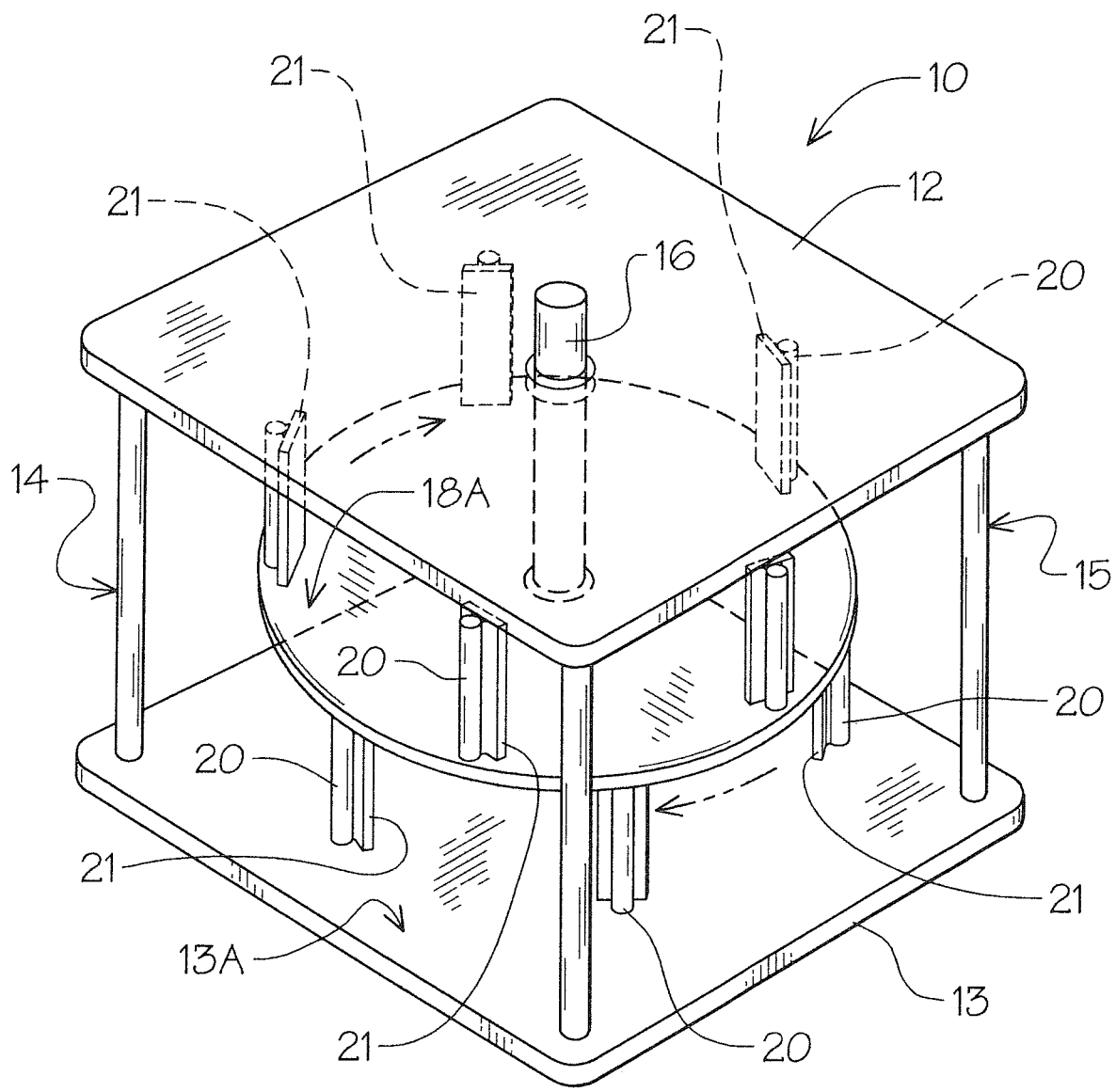
FIG. 3 is an illustrative graphic perspective view of the primary form of the invention with portions (electro-magnets) broken away for clarity.

Referring to FIGS. 1 through 3, a magnetic field motor 10 of the invention can be seen, in this example having a support frame 11 with spaced aligned upper and lower platform supports 12,13. Pairs of support frame interconnecting elements 14,15 secure the platform supports 12,13 together at their respective perimeter corners. A central drive shaft (axle) 16 extends rotatably through the respective platform supports 12,13 on respective bearing fittings 17. A drive flywheel (disk) 18 is affixed to the drive shaft 16 between the hereinbefore described support platforms 12,13. The drive flywheel 18 is of an annular dimension less than that of the interior perimeter dimension of the respective support platforms, thereby defining a flywheel support cage 19.

A plurality of permanent magnet support and mounting post 20 extend from respective opposing wheel surfaces 18A, 18B of the flywheel 18 annular spaced to one another inwardly from the perimeter edge of the flywheel 18.

In this example, five permanent magnets support and mounting post 20 extend from each of the respective drive wheel disk opposing surfaces 18A, 18B in associated staggered spacing to one another, thereby defining an overall even annular spaced relationship therebetween, as seen in FIG. 2 of the drawings.

However, it will be noted that while this spacing and orientation is illustrated in the preferred embodiment, other configurations are possible within the scope of the disclosed invention.

Each of the mounting posts 20 have an elongated permanent magnet 21 adjustably mounted in parallel relationship thereto. In this example, the magnet mounting means may be any configuration that allows for angular positional adjustment of the magnets 21 on the post 20, so as to provide and maintain the efficient magnetic field through multiple corresponding fixed electro-magnets 22 as the flywheel rotates, as will be described in greater detail hereinafter.

The electro-magnets 22 are thereby mounted in fixed relation as noted on the respective effacing surfaces 12A, 13A of the upper and lower platform supports 12,13, best seen in FIGS. 1 and 2 of the drawings. In this example, four electro-magnets 22 are shown extending from each of the platform surfaces in vertically aligned pairs, spaced inwardly from the respective platform corresponding perimeter edges 12B,13B. The stationary electro-magnets 22 are spaced equally as noted in spaced opposing pairs and inwardly positioned so as to be magnetically engaged with the rotating permanent magnets 21 as they pass by. It will be seen therefore that the respective magnetic fields which are (polar oriented north to south) overlap when the electro-magnets 22 are selectively and sequentially energized by a power control circuit PC in communication with the source of electrical power.

The power control circuit PC has a series of electronic proximity switches 23 which are individually positioned thereabout the respective surfaces 12A and 13A, which upon activation sequentially impart, during operation a pushing force against the rotating permanent magnets 21 causing the flywheel 18 to rotate, indicated by directional arrows A in FIGS. 1 and 2 of the drawings.

By providing each of stationary electro-magnets 22 with a corresponding proximity switch 23, the control circuit PC can regulate the electro-magnets 22 activation as noted, thereby maximizing the induced rotational forces to the drive wheel 18 and its attached drive output shaft 16.

Figure 4:
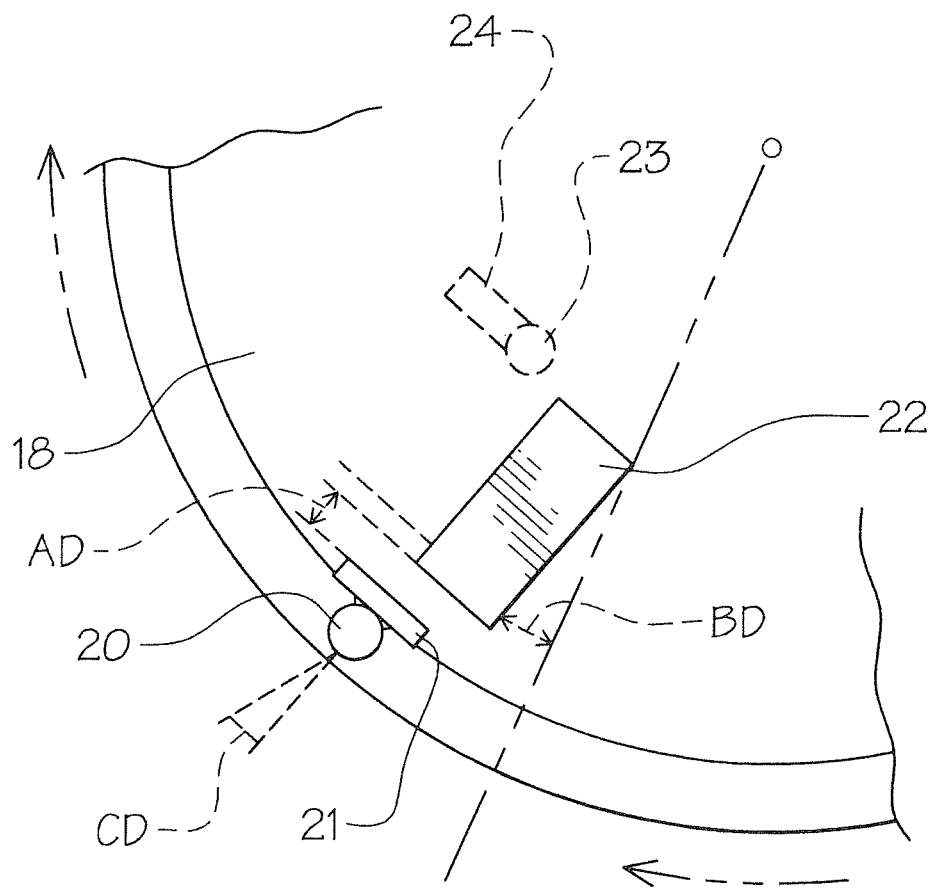
FIG. 4 is an enlarged illustration of permanent magnets adjustable mounting in spacing relationship to the fixed electro-magnets and associated proximity switches and annular positioning.

It will be seen that given the permanent magnets 21 angular adjustability on its respective mounting posts 20, the magnetic field motor 10 of the invention can be effectively 'tuned' to provide the best magnetic orientation, illustrated by directional arrows in FIG. 4 of the drawings.

It will therefore be evident that the angular orientation and spacing of the adjustable perimeter magnet 21 in relation to the corresponding fixed electro-magnets 22 and that position on the support platforms 12, 13 are critical.

It will be seen that there are four critical angles and distances required as follows, illustrated in FIG. 4 of the drawings as follows:

The distance between the electro-magnet 22 and the permanent magnet 21 indicating at AD.

The angle of the electro-magnet 22 with respective edge of the disk 18 indicating at BD and the angle of the permanent magnet 22 with respective edge of the disk CD.

The proximity switches 23 which will activate the electro-magnets 22 sequentially can be located in any convenient orientation; in this example on the platform surfaces facing the flywheel 18. It will be clear that the proximity switch 23 associated detecting object used to activate the switch will always be located on the surface from which the permanent magnets extend.

The magnet to magnet distance as noted above, AD and the angles for BD and CD should be selected for each different motor application to maximize flux strength between the magnets, which will be very dependent on magnet size, strength and shape.

The shape of the magnet should be selected or manufactured to supply the maxim magnetic flux, given the operational perimeters of space required. In this example, the permanent magnet 21 is thin to allow it to pass as close as possible to the electro-magnet 22 without being attracted to its core, which obviously would act against the desired rotational direction of the disk, as is evident to those skilled in the art.

It will therefore be seen that the magnetic motor 10 of the invention is not limited to size restriction, weight, or number of magnets or drive wheels and physical orientation, which all can be varied to meet the user's requirements and venues. The electronic power control circuit PC and source of power will be determined by application use, such as fixed or mobile, and maybe a variety of equivalent circuit components and designs for such configurations, which are well-known within the art to activate and control perimeters dependent on use structure venues as noted.

It will therefore be seen that a new and novel electro-magnetic motor has been illustrated and described and that various changes and modifications may be made thereto without departing from the spirit of the invention.

Therefore, I claim:

1. An electro-magnetic motor comprising,
a support frame having a pair of spaced platform supports,
an output shaft rotatably attached within said support frame,
a drive flywheel disk affixed to said output shaft,
a plurality of permanent magnets and adjustable mounting assemblies on opposing surfaces of said drive flywheel for movement along a predetermined circular path,
a plurality of selectively energized electro-magnets extending in annular fixed relation to one another on each platform support surface in opposing relation to one another whereby at least one of said permanent magnets are repelled by at least one of said energized electro-magnets in opposite directions along a first portion of said predetermined paths,
a plurality of proximity switches on said opposing surfaces of said drive flywheel disk in spaced adjacent relation to said electro-magnets and in communication therewith.

2. The electro-magnetic motor set forth in claim 1 wherein each of said plurality of permanent magnets and adjustable mounting assemblies comprises,
a mounting post, said permanent magnet angularly adjustably attached on said mounting post in respective angular inclination to the drive flywheel disk edge.

3. The electro-magnetic motor set forth in claim 1 wherein said drive flywheel disk is of a diameter less than that of said respective support frame platform supports.

4. The electro-magnetic motor set forth in claim 1 wherein said selective controlled electro-magnets are in communication with a source of electrical power through a power actuation control module.

5. The electro-magnetic motor set forth in claim 1 wherein magnetic fields of said permanent magnets and said electro-magnets during sequential energization are polar oriented north to north and south to south respectively in overlapping relation.

6. The electro-magnetic motor set forth in claim 1 wherein each of said plurality of permanent magnets includes a first magnetic pole of one polarity which is repelled by first pair of magnetic poles of said electro-magnets of said same polarity during energization.

7. The electro-magnetic motor set forth in claim 2 wherein said electro-magnets are in fixed relation to one another and in angular orientation to said adjustable permanent magnets defines while said angular orientation to a radial from said output shaft to said drive flywheel disk edge.

8. The electro-magnetic motor set forth in claim 4 wherein said power activation control module measures electro-magnetic motor parameters and adjust power supply voltage to said electro-magnets in response thereto.

9. The electro-magnetic motor set forth in claim 1 wherein said selectively controlled electro magnets are energized by a brief pulse of electric current.

* * * * *